Figure 1:
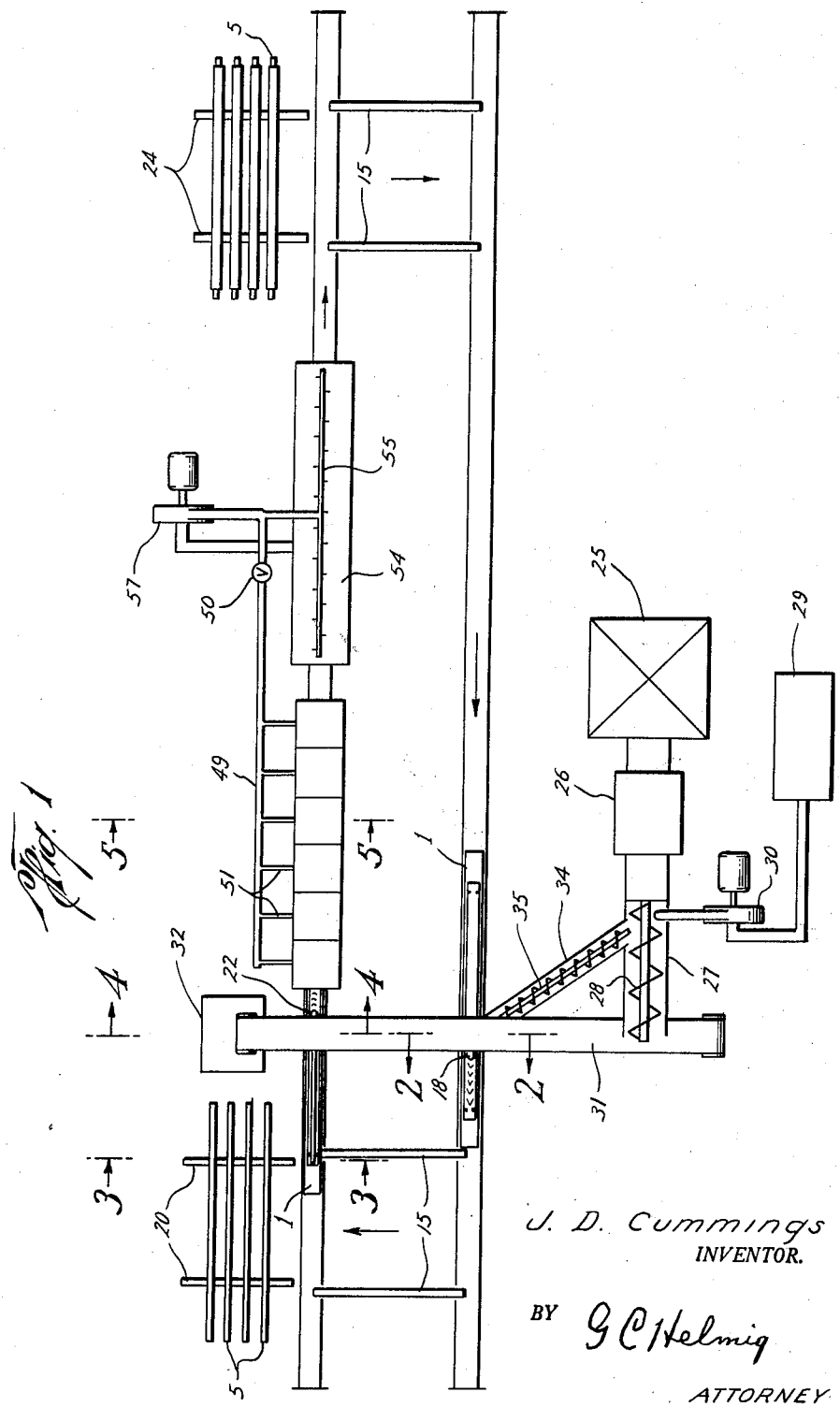

Oct. 27, 1959    J. D. CUMMINGS    2,909,825
ASPHALT COATING OF PIPE
Filed March 12, 1956    3 Sheets-Sheet 1

J. D. Cummings
INVENTOR.

BY G C Helmig
ATTORNEY

Oct. 27, 1959

J. D. CUMMINGS 2,909,825

ASPHALT COATING OF PIPE

Filed March 12, 1956

3 Sheets-Sheet 2

J. D. Cummings
INVENTOR.

BY G C Helmig
ATTORNEY

Oct. 27, 1959
J. D. CUMMINGS
2,909,825
ASPHALT COATING OF PIPE
Filed March 12, 1956
3 Sheets-Sheet 3
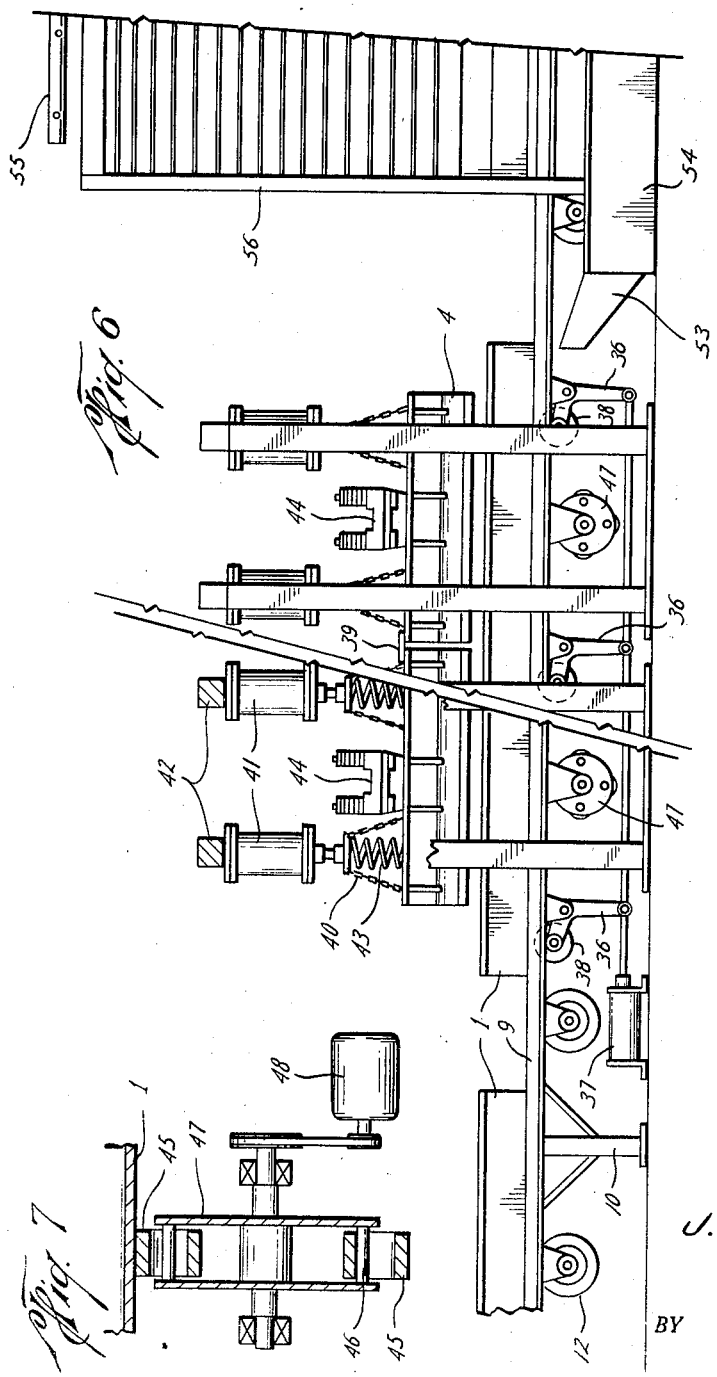
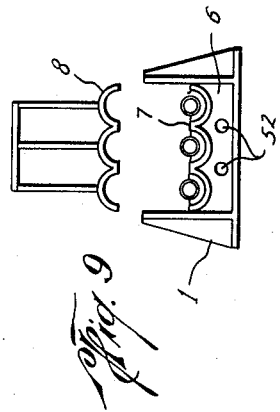
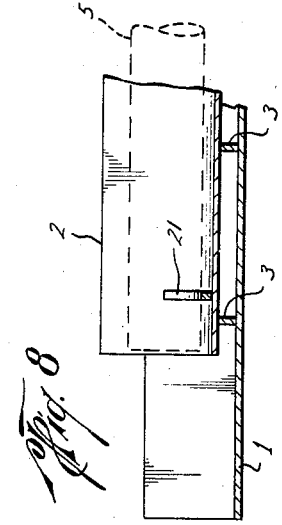
J. D. Cummings
INVENTOR.
BY G C Helmig
ATTORNEY

United States Patent Office 2,909,825
Patented Oct. 27, 1959

2,909,825

ASPHALT COATING OF PIPE

James D. Cummings, Houston, Tex., assignor to Crutcher-Rolfs-Cummings, Inc., Houston, Tex., a corporation of Texas Application March 12, 1956, Serial No. 570,963

7 Claims. (Cl. 25—38)

This invention relates to the coating of pipe such as is buried in the earth for fluid conducting pipe lines and which are usually steel pipe protectively encased within a corrosion resistant sheath.

It is an object of the invention to provide improved technique especially adapted for yard or factory utilization in the molding of a solid coherent shield on a pipe by employing a circuit of successive work performing stations through which a mold or series of molds travel in the sequential performance, with a minimum of manual effort and attention, of the steps for completing the operations of forming a hardened and tough waterproof and air tight impervious covering layer securely bonded about the outside surface of a length of pipe.

Another object of the invention is to provide work station equipment especially adapted for high production, continuous operation with conveyor line travel of the work for quickly applying a thick pipe covering which initially is a somewhat plastic mixture of dry aggregate and hot fluid sticky asphalt introduced in controlled amount and in pipe surrounding relation within a traveling mold and then compacted into a densified and intimate particle, self supporting form and cooled and shrunk into a solid and rocklike hard body substantially free of voids and tackiness.

A further object of the invention is to provide pressure applying complementary molds for the reception of a pipe surrounding plastic asphalt and aggregate mixture and co-operating supports for the mold parts by which closing of the molds for crowding the mixture is regulated, together with mold vibration producing mechanism operable concurrently with pressure application for violently shaking the mixture being crowded to assist in packing together in more intmate relation the granular solids or hard filler particles of the mix as the viscous asphaltic binder flows into the interstices between the particle grains and fills all voids to produce an impervious integrated mass. In order that the coating mixture layer when finally removed from the molds will remain under compaction stress, it is proposed to decrease its fluidity by the forcible extraction of the heat of fluidity so that the densified mass will solidify and tend toward a further contraction and shrinkage with heat loss to normal air temperature.

Illustrative equipment for practicing the invention is shown in the attached drawings, wherein Figure 1 is a top plan view of a yard installation in schematic presentation; Figs. 2 to 5, inclusive, are transverse detail sectional views as on lines 2—2, 3—3, 4—4, and 5—5, respectively, of Fig. 1; Fig. 6 is an enlarged side elevation with parts broken away of the mechanisms at the compacting press station; Fig. 7 is a transverse section illustrating one embodiment of an arrangement for producing vibration during the compacting operation; Fig. 8 is a longitudinal sectional view of a fragment of the travel mold assembly; and Fig. 9 is a transverse section of the mold parts for use with relatively small diameter pipe.

Figure 5:
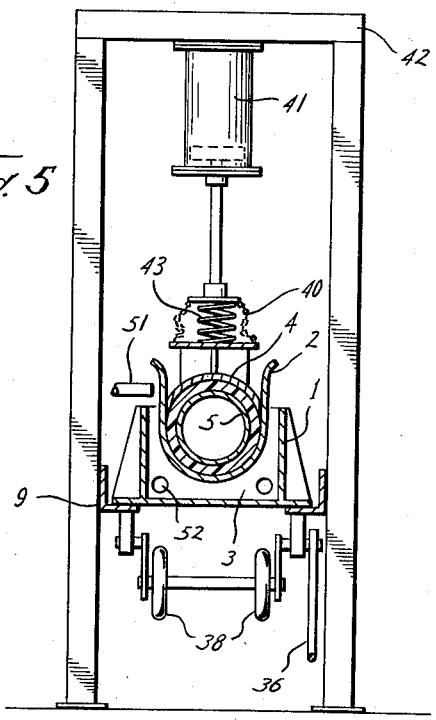

For simultaneously performing different working operations at each of a succession of stations, it is proposed to have a number of cavity molds and to transfer them progressively from station to station in a conveyor circuit. For handling large diameter pipe, each travel mold may consist of a pair of upwardly opening metal channels 1 and 2 nested one within the other and held in spaced apart relation by a number of longitudinally spaced and transversely disposed webs or spacer plates 3. Each spacer plate is replaceably fitted and supported within the outer and wider channel or carrier 1 and has an upper edge notch as a seat in which the inner and narrower channel or trough 2 is saddled to extend throughout its major depth in the well of the outer channel or carrier 1, as seen in Fig. 5 and other of the sectional views, so that most of the mold cavity afforded by the inner trough is jacketed by the chamber space afforded by the outer carrier channel. This hollow jacket is for the circulation of a cooling medium, as will later be explained.

The mold cavity of the inner trough channel 2 has a semicircular bottom wall from which the opposite side walls extend upwardly at a slight draft angle and terminate in outwardly and upwardly inclined upper edge portions forming an inwardly flared entrance mouth or guide into the mouth cavity, useful both in mold filling operations and in the reception of a complementary mold plate or cover part 4, which is arcuate in cross section to co-operate with the configuration of the cavity mold in completing a circular outline concentric with the pipe 5 to be treated. In radial dimension the semiround bottom of the mold cavity exceeds that of the pipe 5 by an amount which will determine coating thickness. Thus a cavity radius of seven inches to receive a pipe whose diameter is twelve inches will result in a coating thickness of one inch. These dimensions can be varied according to coating thicknesses desired. Replaceability of the spacer plates 3 enables the outer carrier channel to be used with various sizes of inner channels to suit particular pipe diameters. Spacer plates with more than one locating notch, as seen at 6 in Fig. 9, will permit a multiple trough die 7 to be placed in the carrier channel 1 for co-operation with a multiple die closing mold 8 when smaller diameter pipe is to be coated. For universal usage, the carrier channel 1 should be of a length to accommodate the longest of the pipe receiving inner troughs with which a particular installation will deal.

Figure 2:
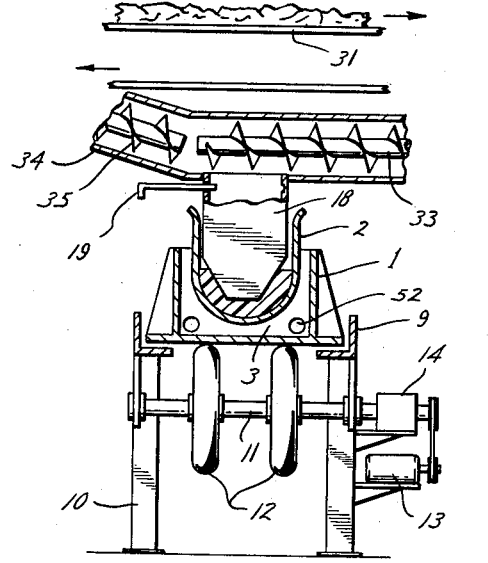

The working circuit through which the lower mold assemblies will pass may be arranged generally as schematically illustrated in Fig. 1, wherein a pair of longitudinally extending conveyor tracks are in spaced apart parallelism and at opposite ends are bridged by transversely extending transfer devices and the movement of travel mold assembly is clockwise, as shown by direction indicating arrows. Each of the longitudinally extending tracks includes a pair of oppositely facing angle iron straps 9 supported at convenient work level by posts or legs 10. In underslung relation to the angle straps 9 and at spaced apart intervals, are mounted axles 11 for a pair of automotive-type rubber tired wheels whose upper tread surfaces project slightly above the lower flanges of the lower straps 9 for supporting contact with the underside of the outer channels of the mold assemblies, which are pocketed between and guided by the angle strap side flanges, as best seen in Fig. 2. Manual effort can be relied on to push the cavity mold assembly along the conveyor tracks, but preferably some or all of the conveyor wheels roll under applied power, and in particular those wheels or rollers at the coating mixture stations can be powered for the advance of the cavity mold assembly past mixture delivery nozzles at a selected constant rate. By way of example, Fig. 2 shows a motor 13 drive connected with the wheels 12 through the axle 11 and a variable speed transmission 14.

Figure 3:
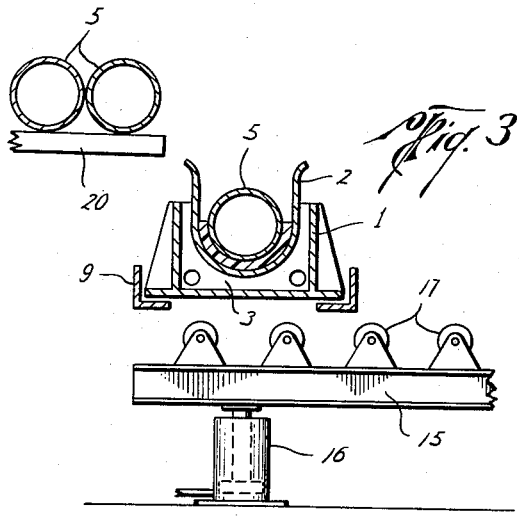

For the transfer of mold assemblies between the ends of the longitudinal tracks, a pair of elevator rails 15 are employed to ride upwardly through clearance openings aligned therewith in the inner angle rails of the longitudinal tracks. Each end of each transverse rail 15 is based on a lift ram of a fluid pressure motor 16, as seen in Fig. 3. Antifriction wheels or rollers 17 are carried by the rails 15, and when both rails are elevated their wheels engage and lift a cavity mold on the longitudinal track thereabove and permit the mold to be rolled across and lowered on the other longitudinal track.

At the right-hand end of the longitudinal track on which the molds will move toward the left, as seen in Fig. 1, the oncoming molds will be cleaned up and prepared for the molding operation. The cavity mold surface can be inspected and smoothed of any foreign matter lying on or clinging thereto and then the smooth surface can be oiled or wiped to deposit a thin surface film of any material which will minimize adherence of hot tacky asphalt thereto. These cleaning and oiling operations can be performed in succession as the mold moves along to the next work performing station, at which a plastic mix of aggregate and hot asphalt is spread throughout the bottom of the mold as the mold advances under a delivery nozzle, such as shown at 18 in Fig. 2, and which is provided with a slide valve or gate 19 by which the volume of mix delivered is controlled to suit the rate of mold travel for laying down the desired thickness of plastic material along the length of the trough 2. At its discharge end the transverse walls of the discharge chute 18 are in the form of a dependent truncated cone, so that the material deposited in the trough will have a thickness that approximates uniformity and is somewhat semicylindrical throughout the bottom of the trough, with an upwardly opening pipe receiving valley. As deposited, the thicknesses of material will be slightly in excess of the final hardened coating thickness. Operation of the control valve 19 will determine the beginning and ending of the initial filling operation, and after the trough passes beyond the filling nozzle, it will have reached the end of the track and will be ready for transfer on the transverse rails 15 to the companion track, on which the mold travel direction is reversed. At the receiving end of the longitudinal return track is a pipe loading station which involves a supporting rack 20 for holding incoming pipe, which preferably has been pretreated with a thin priming film of asphalt to insure better adherence of the coating to the steel pipe. A length of the pipe will be laid in the previously deposited bed of coating material. Half-ring spacer seats 21 can be fitted to opposite ends of the trough 2 as stop seats for the pipe, and which will be spaced inwardly from the ends of the pipe and define markers between which the coating is deposited so that the length of the coating material is slightly less than the length of the pipe, whereby the pipe ends are left exposed for the subsequent welding operation by which the pipes are joined in end to end relation.

As the pipe carrying mold now moves forward to the next work performing operation, its leading end will come under a mixture discharge nozzle 22 having a control slide valve 23 and terminating in both sides in an inverted truncated V shape (see Fig. 4) by which the material is spread over the top of the pipe to completely surround it and is given a thickness conforming roughly to its final cylinder shape. Again the control of the discharge is related to the speed of forward travel, and the coating material is spread out uniformly throughout the length of pipe to be coated. On leaving the final loading station, the trough with the hot mix completely surrounding the pipe moves into a pressuring station where the further advance is temporarily delayed and the material is thoroughly compacted to final cylindrical form, after which travel is resumed to move the assembly through a cooling station and to the final unloading station, which includes the supporting rack 24 at the side of the trailing end of the conveyor line. The emptied molds will then be transferred by the transverse rails 15 at the right-hand end, as viewed in Fig. 1, for the repetition of the operating cycle.

The coating material has been referred to as a mixture of asphalt and aggregate. The asphalt provides a binder which is resistant to moisture and electric current flow. It is hard at normal atmospheric temperatures, and the usual commercial asphalts have flow temperatures on the order of 350° to 400° Fahrenheit. The proportion of asphalt employed can vary from fifty percent on down to approximately sixteen percent, and for most uses the preference is to keep the asphalt content in the lower range, so that practically all the hot bitumen fluid is used up in covering individual aggregate particles within a substantially complete enveloping sticky film for bonded adherence with neighboring particles in a hot semiplastic compound consisting primarily of soft coated hard aggregate. The aggregate filler makes for bulk hardness of the coating and adds weight to the pipe. The latter can be of special significance for decreasing buoyancy in pipe line water crossings. Particular usage will determine the combination desired of fine and coarse aggregate and of other additives, such as asbestos fibers, but for most usages a fine soft sand is preferred over sharp or coarse particles because of better packing and more friction free movement into particle intimacy and hard mass consolidation, the smoother sand being less likely to leave open spaces between adjoining grains.

Figure 4:
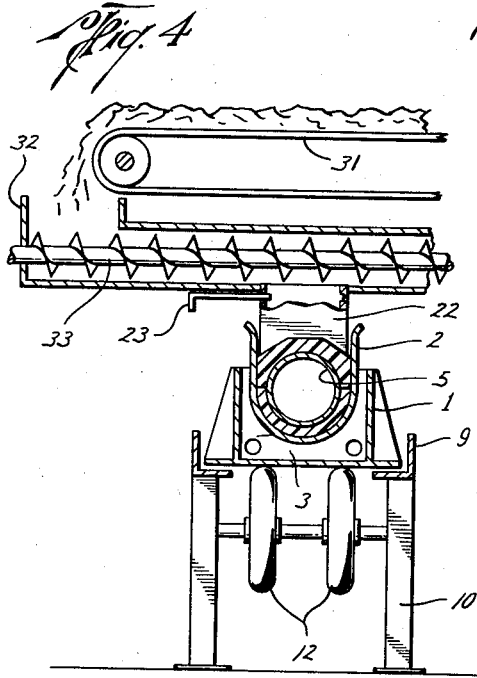

The raw sand or bulk particle filler is placed within a hopper 25 from which it is fed at a controlled rate through a bottom valved opening and by a suitable feed screw into and through a heating oven 26, where any entrained moisture is driven off and the baked dry sand is delivered into a mixing box 27 containing rotary paddles or vanes diagrammatically represented at 28. The asphalt is melted in a tar kettle 29 and fed from the kettle by a motor driven pump 30 into the mixing chamber 27. Here the hot dry sand and hot fluid asphalt are thoroughly intermingled and then dumped on an endless belt 31 which straddles the conveyor lines and discharges its load into a receiving hopper 32 on the far side of the conveyor line assembly. The hopper 32, as seen in Fig. 4, leads to a motor driven screw conveyor 33 under the belt and back across both conveyor lines and supplies the coating compound to each of the discharge nozzles 22 and 18 in succession. The supply is delivered in excess of normal needs and is moving continuously without interruption, and the excess is delivered by the screw 33 into a returning chute 34 containing a feed screw 35 and leading upwardly and back to the mixing chamber 27, where it is again stirred up and mixed thoroughly with any incoming materials.

At the press station the conveyor wheels are mounted on pivoted bell crank levers 36, whose lower ends are joined by connecting rods to a fluid pressure reciprocating motor 37 by which the several bell crank levers 36 can be oscillated to project and retract the conveyor wheels 38 above and below the angle straps 9. When projected upwardly, the wheels will facilitate the travel of the loaded cavity mold into and out of the press, but during the pressurizing operation the wheels are depressed so that the mold will bottom and be supported by the angle straps 9. The upper or cover mold conveniently is formed in end to end sections loosely tied together by overlapping end plates 39, and each section when in open position is suspended by flexible cables or chains 40 from the rams of a pair of piston cylinder motors 41 suspended by framing members 42 which straddle the conveyor line. For closing the mold, air under pressure supplied to each of the motors 41 will push the cover mold 4 down into the open mouth of the lower die and into pressure contact with the coating material. At such time the suspension chains 40 will become inactive or will be slackened and the force will be resiliently transmitted through heavy coil springs 43 interposed between the ram and the pressure plate 4. As the squeezing operation proceeds, electric current will be supplied to a series of electromagnetic vibrators 44 carried by the sectional cover mold 4, which will tend to violently vibrate the cover plate and in which action the elasticity of the springs 43 co-operates for pounding or tamping down on the plastic coating mixture. Simultaneously the cavity mold will also be caused to vibrate, and for that purpose there is rotatably suspended beneath the press a series of inertia weights or hammers 45 arranged in sets of four and each loosely mounted on a pin 46 carried between supporting plates 47, which are driven at high speed through a belted connection with an electric motor 48. High speed rotation of the motor 48 will cause the weights 45 to move outwardly by centrifugal action. They are so mounted that their path of rotation will intersect the underside of the mold carrier 1 and will impose thereon repetitive hammer blows of great force. The vibration mechanisms for the upper and lower molds are arranged to operate in an out of phase relation with one another, and they co-operate for shaking down the solid particles in the plastic mix concurrently with the pressure being imposed on the fluid asphalt to force it tightly into any voids. A thoroughly compacted and integrated mass results, and it is had through the combination of vibration and pressure to such extent that terrifically high pressure forces are not required. Pressures as low as 7,000 pounds per square inch with impacts for a few minutes will be sufficient and will not require the generation and handling of operating pressures which are difficult to control and require expensive equipment if frequent blowouts are to be avoided.

As the coating material is being shaken down and compressed, it preferably is also having heat extracted from it, and especially during the later stages of pressurization when the hot fluidity of the asphalt has served its flow purposes. For the start of cooling, water or other suitable liquid is pumped through a manifold 49 under control of a valve 50 and through branch pipes 51 which extend inwardly of the press and discharge as indicated in Fig. 5 into the chamber space between the inner and outer channel sections. The endmost of the supporting webs 3, and which would be at the trailing end of the mold when on the conveyor leading through the press, is solid, but all the remaining webs are provided with communicating openings 52 for the movement of the cooling water from chamber to chamber through the jacket to the leading end of the mold, which, as shown in Fig. 6, overhangs a funnel or tray 53 leading to a water collecting sump 54. As this cooling water flows through the jacket in contact with the underside of the bottom mold 2, it cools the mold and carries heat away from the pipe surrounding coating material for initiating the hardening or solidification of the hot plastic. Such transfer of heat will tend to induce some slight shrinkage, which will facilitate the eventual separation of the mold parts and co-operate with the pressurizing action, and with the start of the cooling occurring during pressurizing, the parts will remain under a certain compacting stress. At the completion of the pressurization, the vibrators are cut out of action and the mold parts are separated, whereupon the supporting wheels 38 can be raised and the mold moved on to the next station, which is a continuation of heat extraction. This station overlies the water collecting sump 54 and consists primarily of a series of overhead spray heads which will extend along the entire length of the mold, as seen at 55 in Figs. 1 and 6, and at the top of a cooling tower 56, whereby the descending water spray is air cooled and drops on the mold and its contents to flood the same and complete the cooling down to a temperature where the fluidity of the coating is substantially removed and the coating is set up as a hard and dense cover. A motor driven pump 57 has its suction side connected with the sump 54 and its outlet side joined with the spray head manifold 55 and with the delivery manifold 49 under control of the valve 50. The covered pipe can then be removed from the mold as the latter moves beside the unloading storage rack 24.

The foregoing specification has dealt merely with a preferred embodiment of the invention, which is not to be limited in scope except as set out in the attached claims.

What is claimed is:

1. Apparatus for applying coating on pipe or the like, including a mechanism for mixing a hot asphalt and a dry aggregate, a pair of spaced apart feed nozzles controlling feed of the mixture, means to pass a mold under one of said nozzles at a rate of travel related to feed nozzle output as to place a given thickness layer of mixture in the bottom of the mold, means to lay a pipe in said mold containing mixture and conveyor means to pass the pipe supporting mold under the other of said nozzles at a rate of travel related to feed nozzle output to cover the upper side of the pipe with a given thickness of the mixture, a pressure actuated complementary mold movable into closing relation with the first mold and into pressure applying relation with the mixture within the mold to compact the mixture against the pipe surface and other means operating concurrently with the application of pressure on the mixture between the molds to vibrate the molds for a densification of the mixture and cooling mechanism operative on the compact mixture to extract heat therefrom and complete the setting of the same.

2. Apparatus for protectively coating a pipe or the like, including a track, a mold movable on the track through a succession of work performing stations, feed devices at each of two spaced apart stations operative during mold travel to place a semiplastic mixture of hot asphalt and aggregate in the bottom of the mold at the first of said two stations and in the upper portion of the mold at the other of said two stations to cover a pipe loaded in the mold at a station between said two stations, a mold cover at a mixture compacting station at which travel of the loaded mold is stopped for co-operation of said mold cover with the mold, pressure applying mechanism operative to bring the mold and its cover into closing relation and impose a squeezing pressure on the hot mixture against the pipe surface, vibration producing means operative to shake the mixture while it is being squeezed within the closed mold for a more effective densification of the pressurized mixture, a cooling mechanism at a work performing station beyond the compacting station operative to extract heat from the densified mixture for the further mass shinkage and solidification of the same.

3. Apparatus for compacting a protective pipe coating, including a pair of complementary mold parts one of which is a cavity to be loaded with a pipe and an asphalt mix surrounding the pipe and the other of which is a cover for closing the cavity and applying squeezing pressure on the asphalt mix, a support on which one of the mold parts can be removably seated, a series of conveyor wheels, means adjustably mounting said wheels adjacent the support for vertical wheel movement between a position below said support and a position in which the wheels project above said support for rolling engagement by the last mentioned mold part into and out of superposed relation with the support, another support connected with the other of said mold parts and arranged to position the same in superposed aligned relation with a mold part seated on the first mentioned support, means to move said supports toward and from closing relation in which said asphalt mix is pressurized against the pipe surface and other means operative to vibrate the mold parts while the asphalt mix is being pressurized.

4. The structure of claim 3 wherein the means to vibrate the mold parts include separate mechanisms associated with the respective mold parts and operable to shake them in out of phase relation to one another.

5. Apparatus for compacting a protective pipe coating, including a mold having a cavity to receive a pipe and an asphalt mix surrounding the pipe, a support on which said mold may be seated, a series of mold conveyor wheels co-operatively related to said support, means adjustably mounting said wheels for vertical movement between two positions in one of which their treads are below said support and in another of which the wheel treads are above said support, a rotatable member mounted on an axis below said support, a loosely mounted inertia weight carried by said rotatable member for rotation therewith in a path which extends above the top of said support for repetitive striking impact on a mold part seated on the support, a cover mold complementary to said cavity mold, means to close said cover mold and exert compacting pressure on the asphalt mix within a support seated mold and other means for vibrating said cover mold.

6. Apparatus for compacting a protective pipe coating, including a mold assembly having an open cavity to receive a pipe and hot asphalt mix surrounding the pipe and having a cooling jacket for circulation of cooling medium therethrough, a conveyor line having a series of rollers for travel of the mold assembly thereon, adjustable roller mounting means for raising and lowering certain of said rollers, a support adjacent said mounting means and on which a mold assembly bottoms should the conveyor rollers supporting the same be lowered, a complementary cover mold adjustably positioned at said support for movement into the cavity mold and the exertion of compacting pressure on said hot asphalt mix and means to deliver cooling liquid into said jacket during the pressurizing of said hot asphalt for the removal of heat therefrom and the solidification thereof while under pressure.

7. Apparatus for compacting a protective pipe coating, including a mold having a cavity to receive a hot asphalt mix in surrounding relation with a pipe coated therewith and having a cooling jacket with an end discharge outlet for cooling liquid circulated through the jacket, a conveyor line for the traveling support of the mold from one work station to another, a complementary cover mold at one work station, means to move said cover mold into closing relation with the cavity mold when the latter is aligned with the cover mold and for exerting compacting pressure on the hot asphalt mix, means at said one work station to deliver cooling liquid to the cooling jacket for the extraction of heat from the hot asphalt being compacted, other means at another work station next succeeding said one work station in the path of the conveyor line for flooding cooling liquid on the cavity mold and previously compacted mix therein upon travel of the cavity mold away from said one work station, a liquid collecting sump beneath said liquid flooding means and additional sump means beneath the location of the jacket discharge outlet when the conveyor mold is positioned at said one work station.

References Cited in the file of this patent

UNITED STATES PATENTS

| | | |
|---|---|---|
| 269,749 | Vollrath | Dec. 26, 1882 |
| 1,001,528 | Johnson | Aug. 22, 1911 |
| 1,411,757 | Sumpter | Apr. 4, 1922 |
| 1,842,298 | Smith | Jan. 19, 1932 |
| 2,053,307 | Wilaon | Sept. 8, 1936 |
| 2,186,361 | Byran et al. | Jan. 9, 1940 |
| 2,287,828 | Bryan | June 30, 1942 |
| 2,295,858 | McWane | Sept. 15, 1942 |
| 2,306,037 | Colvin | Dec. 22, 1942 |
| 2,358,259 | Siedschlag et al. | Sept. 12, 1944 |
| 2,394,943 | Stancliffe | Feb. 12, 1946 |
| 2,465,799 | Gravesen | Mar. 29, 1949 |
| 2,467,642 | Wilson et al. | Apr. 19, 1949 |
| 2,554,453 | Bryan | May 22, 1951 |
| 2,586,210 | Corwin | Feb. 19, 1952 |
| 2,719,346 | Caciagli | Oct. 4, 1955 |
| 2,815,535 | Bodine | Dec. 10, 1957 |

FOREIGN PATENTS

| | | |
|---|---|---|
| 192,560 | Great Britain | Feb. 8, 1923 |
| 682,545 | Great Britain | Nov. 12, 1952 |